(12) United States Patent
Pelton

(10) Patent No.: US 7,451,621 B2
(45) Date of Patent: Nov. 18, 2008

(54) BUBBLE FORMATION IN LIQUID SUCH AS MOLTEN GLASS

(75) Inventor: John F. Pelton, deceased, late of Yorktown Heights NY (US); by Nancy Newlin, legal representative, San Jose, CA (US)

(73) Assignee: Praxair Technology, Inc., Danbury, CT (US)

( * ) Notice: Subject to any disclaimer, the term of this patent is extended or adjusted under 35 U.S.C. 154(b) by 449 days.

(21) Appl. No.: 11/136,401

(22) Filed: May 25, 2005

(65) Prior Publication Data

US 2006/0266080 A1 Nov. 30, 2006

(51) Int. Cl.
*C03B 5/16* (2006.01)
*C03B 5/193* (2006.01)

(52) U.S. Cl. .................. 65/134.5; 65/134.9; 65/178; 65/347

(58) Field of Classification Search ............... 65/347, 65/178, 474, 134.9; 261/124, 121.1; 118/726, 118/722
See application file for complete search history.

(56) References Cited

U.S. PATENT DOCUMENTS

| | | | |
|---|---|---|---|
| 2,890,548 A * | 6/1959 | Wright | 65/134.5 |
| 3,622,296 A | 11/1971 | Buehl | |
| 3,874,864 A | 4/1975 | Cuniberto | |
| 3,929,440 A | 12/1975 | Oldfield | |
| 3,960,532 A | 6/1976 | Lazet | |
| 6,854,291 B2 * | 2/2005 | Romer et al. | 65/134.5 |
| 6,871,514 B2 | 3/2005 | Muschik | |
| 2002/0078894 A1 * | 6/2002 | Timmons et al. | 118/726 |
| 2002/0121113 A1 | 9/2002 | Gohlke | |
| 2006/0174655 A1 | 8/2006 | Kobayashi | |

* cited by examiner

*Primary Examiner*—Steven P. Griffin
*Assistant Examiner*—Jodi Cohen
(74) *Attorney, Agent, or Firm*—Donald T. Black

(57) ABSTRACT

Bubbles of uniform diameter of 0.5 to 4 cm of gas such as helium are formed and pass into liquid such as molten glass by accumulating a sufficient volume of gas through a flow restriction into a space upstream of the point of injection at a controlled flow rate.

23 Claims, 2 Drawing Sheets

BUBBLE FORMATION IN LIQUID SUCH AS MOLTEN GLASS

FIELD OF THE INVENTION

The present invention relates to the treatment of liquids, such as molten glass from which useful articles can be manufactured.

BACKGROUND OF THE INVENTION

Injection of gases into liquids is used in a wide range of chemical and metallurgical applications. For example, oxygen gas is injected into water to dissolve oxygen for fish farming or for treatment of aerobic treatment waste water. Argon or nitrogen gas is injected into molten aluminum for refining to remove or to "strip" dissolved hydrogen. Oxygen gas is injected into molten steel for refining to react and remove dissolved carbon.

Gas bubbles can be formed in a liquid by injecting gas from a small nozzle submerged in the liquid. When the gas flow rate is very low, a series of small bubbles is generally produced which are of uniform size and well separated. As the gas flow rate is increased, more bubbles are formed per unit time and coalescing of bubbles can start to occur. As used herein, "coalescing" means the joining together of two or more bubbles to form one bubble, with or without the associated formation of one or more smaller satellite bubbles as well; and bubbles are considered "non-coalescing" if they do not join together but instead remain separated in the liquid. In general, when the gas flow rate through the submerged nozzle is increased further, more frequent coalescing occurs (for instance, four bubbles joining together to form one larger bubble). As the gas flow rate is increased even more, chaotic bubble forming behavior is observed in which many bubbles of various sizes and shapes are formed in a turbulent fashion.

In most of these applications it is desirable to create a large number of small gas bubbles well dispersed in the liquid to accelerate the mass transfer process. Many technologies have been developed to generate small bubbles in liquids. They include injection of gas from a small submerged nozzle at a high velocity, mechanical stirring of a gas-liquid mixture to break up large gas bubbles, and injection of gas from a narrow space between a rotating disc and a stationary disc. In these processes, the viscosity of the liquid is relatively low and the residual gas bubbles rise to the liquid surface quickly and are removed without being trapped in the final product.

In the commercial-scale manufacture of glass articles such as bottles, window glass, and the like, solid feed material is melted in large furnaces. The feed material can comprise pieces of glass typically comprising recycled glass articles, and/or the conventional raw materials of glass manufacture, e.g. sand, limestone and soda ash.

The solid glassmaking feed material enters one end or feed port of the glassmelting furnace, where the feed material is exposed to temperatures in excess of 1300C. to melt the feed materials. The resulting molten glass is withdrawn from an exit port of the glassmelting furnace and conveyed to forming stations where it can be formed into the desired useful articles. The molten glass that is withdrawn from the glass-melting furnace can optionally be conveyed to a holding tank, where it is held in the molten state, before it is conveyed to the forming stations.

The molten glass that is formed in these steps typically contains a large number of small bubbles, called "seeds". Since these seeds are rarely desirable in the final, solid glass product, it is highly desirable to remove them from the glass, and to do so while the glass is still molten. The process of removing small bubbles from molten glass is typically called "fining". The small bubbles can rise to the surface of the molten glass on their own, but only over a period of time that is usually too long to be economically acceptable to the operator. Accordingly, it is necessary to employ other methods to accelerate the removal of these undesired bubbles from the molten glass. Chemical fining agents such as sodium sulfate and antimony oxide are commonly used to generate fining gases, upon dissociation at high temperatures, which diffuse to the small defect bubbles, or seeds, and grow them in size so that they can rise to the molten glass surface faster.

Gas bubblers are often used in glass melting furnaces in order to enhance convective current of molten glass. They are typically located in the floor of the glass tank and the rising gas bubbles lift viscous molten glass and enhance the flow of molten glass. U.S. Pat. No. 2,890,548 teaches methods and apparatus for controlling convective currents of molten glass by injecting gas through a bubbling nozzle. It is advantageous to produce large bubbles to enhance the convective current. Pulsed injection of high pressure gas is taught to increase the bubble size. In U.S. Pat. No. 3,874,865 a self-controlling gaseous bubbler system to produce multiple bubbles from multiple injector nozzles is described using high and low pressure gas supply lines and pneumatic logic elements.

A recent advancement in the art of glass fining is to inject helium gas into molten glass to accelerate fining. Some of the helium gas diffuses out from the helium bubbles, migrates through the glassmelt and into seeds and accelerates the growth of the seeds. While helium gas diffuses out of the helium bubbles, other gases dissolved in the molten glass, such as nitrogen, carbon dioxides, oxygen and sulfur dioxides, diffuse into the helium bubbles. Thus the helium bubbles accelerate the growth of seeds and at the same time "strip" out other undesirable gases dissolved in the molten glass. When the initial size of the helium bubble is large, say greater than 4 cm in diameter, the bubble rises quickly to the surface and only a small fraction of helium gas contained in the bubble can diffuse into seeds and promote the fining action. Most of the helium gas is thus wasted. When the initial size of the helium bubble is too small, say less than 0.5 cm, there is a risk of creating a small defect bubble of helium in the glass product as the size of the helium bubble shrinks with helium gas diffusion and the velocity of the bubble rise becomes too slow.

It has been determined by the present inventor that the passage of bubbles upwards through the molten glass from the bottom of the tank is significantly more effective at removing the undesired small bubbles if the bubbles which are introduced at or through the bottom of the tank are relatively uniform in diameter, since bubbles having too large a variation in size will flow upwards through the molten glass at varying rates which are a function of the size of the respective bubbles, in which event the bubbles can tend to collide and coalesce with each other leading to unsatisfactory performance especially in the removal and the rate of removal of the small bubbles. In addition, it has been determined that bubbles having a uniform diameter which is in the range of 0.5 to 4 cm, preferably in the range of 0.5 to 2 cm, perform advantageously in the removal of the undesired small bubbles.

Although the prior art has taught the use of pulsed injection of high pressure gas into multiple injectors to make large bubbles, the injection system is complex and expensive. There remains a need in this field for a reliable technique for forming bubbles from the bottom of the tank containing the molten glass, wherein the diameters of the formed bubbles are uniformly within a narrow range of diameters falling within the range of 0.5 to 4 cm in diameter.

BRIEF SUMMARY OF THE INVENTION

One aspect of the invention is a method for forming a plurality of streams of non-coalescing bubbles of helium in molten glass, wherein each bubble in a given stream is of substantially the same size, comprising:

(A) providing a tank that contains molten glass;

(B) providing two or more passageways through the bottom of the tank each of which terminates in an upward facing opening that is in fluid communication with said molten glass in said tank below the upper surface of said molten glass;

(C) providing a common gas supply line and a helium source which supplies gaseous helium at pressure to said common gas supply line;

(D) providing gas feed lines each of which is in fluid communication with said gas supply line and with a different one of said passageways, and providing in each gas feed line a gas-permeable restriction so helium passing from said gas supply line to a passageway must pass through a gas-permeable restriction into the space between the restriction and the opening at the end of said passageway, wherein the pressure drop across said restriction is high enough and the volume of said space is large enough that non-coalescing bubbles of helium are produced from the end of said passageway into said molten glass; and (E) providing helium from said source into said gas supply line, wherein said helium passes into said gas feed lines through the restrictions associated therewith and intermittently emerges from the openings at the ends of said passageways as bubbles whose size is a function of the volume of said space, and adjusting the pressure in said gas supply line so that said bubbles are spaced apart by at least half a bubble diameter.

Another aspect of the present invention is apparatus useful for forming a plurality of non-coalescing bubbles of helium in molten glass, wherein each bubble in a given stream is of substantially the same size, comprising:

(A) a tank that can contain molten glass;

(B) two or more passageways through the bottom of the tank each of which terminates in an upward facing opening that is in fluid communication with the interior of said tank;

(C) a common gas supply line and a helium source which supplies gaseous helium at pressure to said common gas supply line; and (D) gas feed lines each of which is in fluid communication with a different one of said passageways and with said gas supply line, wherein each gas feed line contains a gas-permeable restriction so that gas passing from said gas supply line to any passageway must pass through a gas-permeable restriction into the space between the restriction and the opening at the end of said passageway, wherein the pressure drop across said restriction is high enough and the volume of said space is large enough that non-coalescing bubbles of helium are produced from the end of said passageway into said molten glass;

wherein when helium is provided from said helium source into said gas supply line, said helium passes into said gas feed lines through the restrictions associated therewith and intermittently emerges from the openings at the ends of said passageways as bubbles whose size is a function of the volume of said space.

References herein to the diameter of a bubble mean the diameter of a spherical bubble, and in the case of a nonspherical bubble mean the diameter of a sphere having the same volume as the nonspherical bubble.

DETAILED DESCRIPTION OF THE INVENTION

The present invention will be described with respect to its application to a glassmelting furnace. It can be practiced in a furnace which melts glassmaking materials, and it can be practiced in a holding tank for holding molten glass downstream from a glassmelting furnace.

Figure 1:
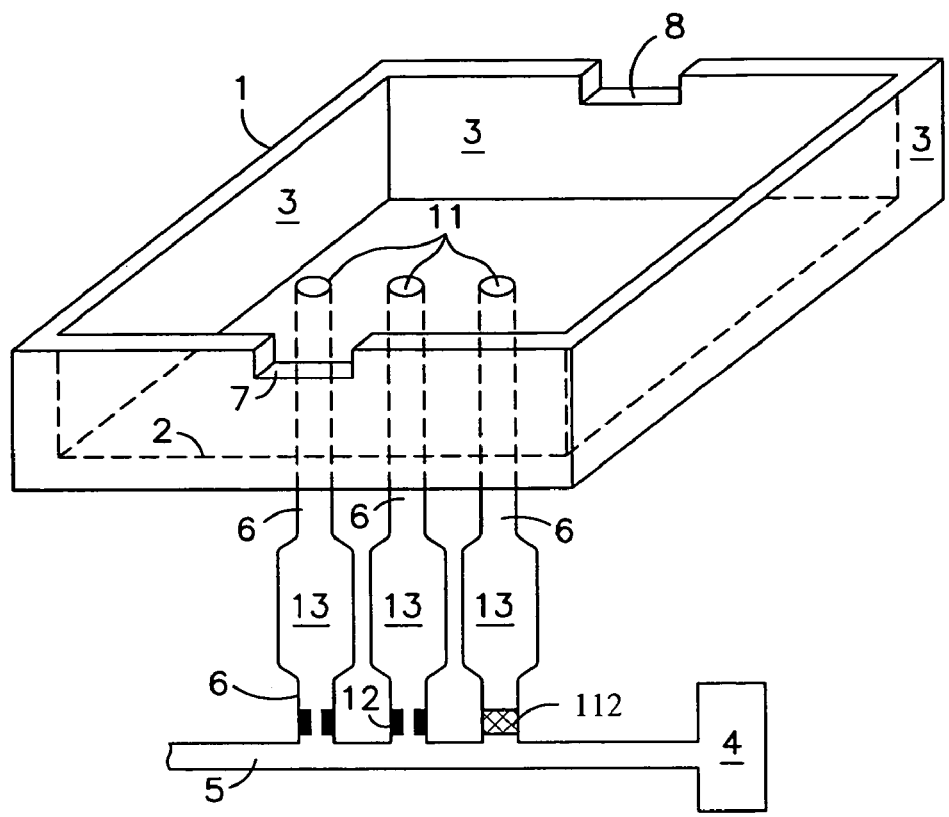
FIG. 1 is a perspective view of a typical tank for holding liquid such as molten glass, with which the present invention can be practiced.

Referring first to FIG. 1, tank 1 comprises generally a bottom 2 and sides 3 which define a chamber for holding molten glass. The particular shape of bottom 2 is not critical, although in general practice it is preferred that at least a portion of bottom 2 is planar and is either horizontal or sloped in the direction of the flow of the molten glass through tank 1. All or a portion of bottom 2 can instead be curved. The particular shape of the tank as defined by sides 3 is also not critical, so long as the sides are high enough to hold the desired amount of molten glass. Tank 1 is also provided with an entrance 7 through which feed material or molten glass flows into the interior of tank 1, and exit 8 through which liquid can flow out of the interior of tank 1. Tank 1 will also generally have a roof (not shown). The bottom, sides and the roof of the tank should be made from refractory materials that can retain its solid structural integrity at the temperatures to which it will be exposed, i.e. typically 1300 to 1700 degrees C. Such materials are widely known in the field of construction of high-temperature apparatus.

Reference numeral 4 denotes a source of gas from which the gas can be supplied under pressure to main supply line 5. In glassmaking operations, a preferred gas comprises helium, preferably comprises at least 80 vol. % helium, and more preferably comprises at least 99 vol. % helium.

Gas feed lines 6 extend from main supply line 5 and are connected to the tank as described below. Source 4 preferably comprises a tank that contains the gas in liquid or gaseous state, together with valves, pressure regulators, one or more compressors and pressure regulators, and associated controls, all of which together permit the operator to control whether or not gas is supplied from the storage tank into the main supply line 5, and to control the pressure and velocity (mass flow rate) at which the gas is provided into the main supply line 5.

The gas can be provided in main supply line 5 at essentially constant pressure, such as 10 to 200 psig, for instance by feeding the gas into line 5 from the outlet of a pressure regulator connected to a pressurized cylinder or a compressor.

Alternatively, a valve can be interposed in line 5 between source 4 and any of lines 6, which valve can be of the type that operates in an open-or-shut mode. There can be more than one main gas supply line associated with one tank of molten glass.

Feed lines 6 are fed by and branch off of main gas supply line 5. One feed line 6 is connected to each passageway 10. The number of feed lines 6 and passageways 10 will depend on the size of the tank bottom 2, the volume of molten glass to be treated, and the desired rate of bubble formation in the molten glass. Restrictions 12 and 112, which are alternative embodiments of restrictions within the lines 6, are described below with respect to FIG. 2.

Figure 2:
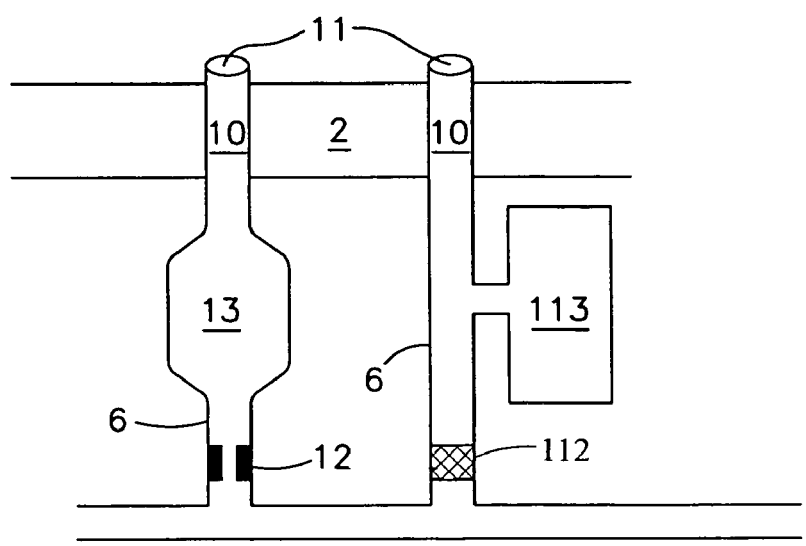
FIG. 2 is a side cross-sectional view of a portion of the tank of FIG. 1, showing embodiments of apparatus for practicing the present invention.

In FIG. 2, the main supply line 5, two feed lines 6, and furnace bottom 2 are all shown in cross-sectional view. Passageways 10 extend through the tank (in this case, through tank bottom 2) and end at openings 11 which are in fluid communication with the tank interior below the upper surface of the liquid. Feed lines 6 (of which there are many in actual operation) extend from main supply line 5 and connect to their associated passageways 10. Openings 11 can be coplanar with tank bottom 2 or, as shown, the passageways can extend a slight distance into the interior of tank 1. Each opening 11 is a single hole, preferably of diameter between 0.1 and 1.0 millimeter, more preferably between 0.2 and 0.5 millimeters.

When passageway 10 extends beyond the tank bottom surface into the liquid, the passageway or at least the portion that extends into the liquid should be made of material that can withstand the temperature of the liquid. When the liquid is molten glass, a preferred material of construction for this portion is platinum, or alumina coated with platinum. It is not significant whether the end of feed line 6 is connected to passageway 10 at the outer end of passageway 10, or extends a distance into passageway 10, or extends completely through passageway 10, so long as feed line 6 is in fluid communication with passageway 10.

Each feed line 6 contains a restriction which permits gas to flow therethrough toward opening 11 and which limits the rate at which gas flows therethrough. The restriction can be established by an added mechanical adjunct such as an object 12 that contains an orifice, or by a porous metallic or glass insert 112 which is an object containing many microporous passageways through which the gas diffuses. The restriction can instead be established without an additional adjunct, by providing a crimped or constricted passageway having an internal diameter less than the internal diameter of the feed line 6 upstream and downstream of the constricted passageway, but this is difficult to achieve and may not be practical. Each restriction is considered to be gas-permeable in the sense that gas can pass through it. The object, the significance of which is described herein, is to establish a pressure drop between the points just upstream and just downstream of the restriction. In a preferred mode of operation, the restriction is a microporous disc or cylinder 112. As described more fully below, it is desirable that the restriction, in conjunction with the pressure at the point just upstream of the restriction, provides a relatively constant flow rate into the space downstream of the restriction during the downstream pressure variations that occur during bubble formation, and that the restriction permits approximately the same flow rate to be provided to each of the openings into the bottom of the tank. As noted above, 12 and 112 represent alternative embodiments for accomplishing the objective. The invention can be practiced using only objects 12, only microporous inserts 112, or only other techniques, or combinations of any of the foregoing.

It has been determined by the present inventor that for satisfactory operation of the present invention, the internal volume of the space between an opening 11 and its associated restriction should be sufficiently high to provide an adequate amount of gas to each bubble that forms and detaches. The desired volume can be provided by including in the feed line a reservoir which has internal dimensions that are larger than those of the feed line 6 and are sufficient to provide the desired total volume. The reservoir can be present in line, like reservoir 13 shown in FIG. 2, or it can be attached via an opening in the side of the feed line, like reservoir 113 shown in FIG. 2. Other arrangements can be employed, so long as they provide the desired aggregate volume between the restriction and opening 11. Alternatively, no distinct reservoir 13 or 113 is needed, if a sufficient length and diameter of the feed line 6 is employed. Typical volumes useful in this aspect of the invention for the space between an opening 11 and the restriction through which gas must pass to reach the opening are 10 to 100,000 cc.

Figure 3:
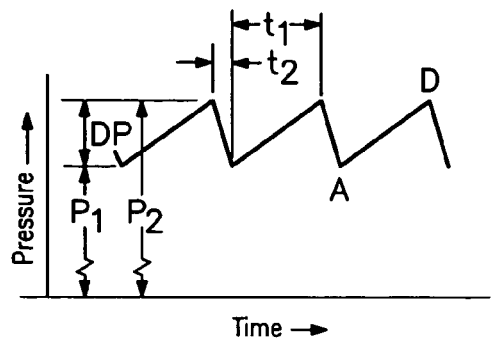
FIG. 3 is a graph representing the changes in pressure at the end of the feed line over a period of time in which a bubble develops and detaches.

Operation of the system represented in FIGS. 1 and 2 will now be described with reference also to FIGS. 3 and 4. Gas is supplied from source 4 into feed line 6 and to the point upstream of each feed line's restriction, typically at a pressure of 10 to 200 psig. The gas passes through the restrictions and into the space between each restriction and its associated opening 11. The gas having passed into the space between a restriction and an opening 11 does not immediately pass into the molten glass, even though the gas is under pressure, because the static pressure of the molten glass, which depends on the depth of the glass in the tank above the opening and the specific gravity of the molten glass, and the surface tension of the molten glass at opening 11 are high enough to prevent gas from passing into the molten glass at this point in the operation.

Figure 4A:
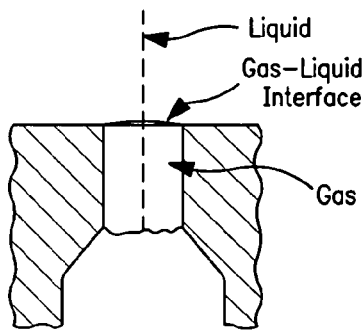
FIGS. 4A through 4E are greatly enlarged side cross-sectional views of the end of a feed line showing the progressive formation of a bubble.
Figure 4B:
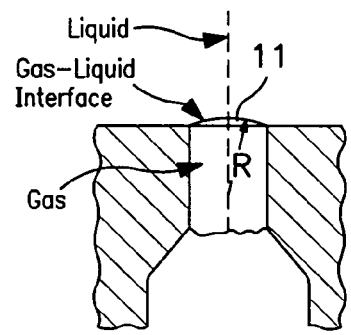
Figure 4C:
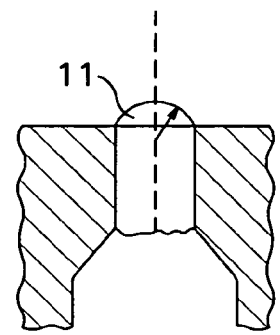
Figure 4D:
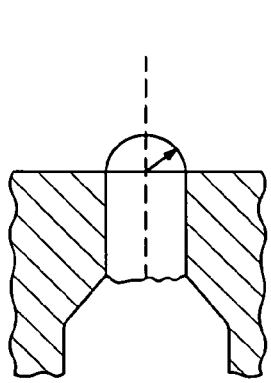
Figure 4E:
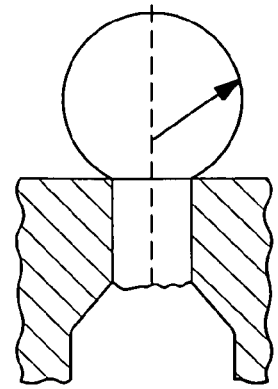

The gas entering the space between a restriction and an associated opening accumulates in that space and increases in pressure. Eventually, as gas continues to be fed into the space between a restriction and an opening, the pressure is high enough to begin the formation of a bubble at opening 11. When bubble formation begins, the pressure at the opening 11 increases as a result of an increase in the surface tension force caused by a decrease in the molten glass-gas interfacial radius. FIGS. 4A, 4B, 4C and 4D show the changes in the shape of the molten glass-gas interfacial area as a gas bubble begins to form at opening 11. This part of the bubble formation process is a relatively slow process as the gas flow passing through the restriction is mostly used to increase the pressure. Referring to FIG. 3, the progression from FIG. 4A through FIGS. 4B, 4C and 4D occurs during the period of increasing pressure that is shown in FIG. 3 as the portion of the line showing the pressure increasing with time (which portion is also shown as occurring over the increment of time denoted as $t_1$). In this interval of time, the pressure at opening 11 increases by DP, from the absolute pressure $P_1$ at the beginning of a bubble formation (when the gas-liquid interface at the opening is ready to begin exceeding the flat interface shown in FIG. 4A) to the absolute pressure $P_2$, when a hemispherical gas-liquid interface is formed as shown in FIG. 4D. At this point the bubble radius becomes the minimum, corresponding to the radius of the opening 11 and the pressure becomes highest. After this point is passed, the pressure at the opening 11 decreases because of increasing bubble radius and there is then a very rapid flow of the gas from the space between the restriction and the opening into the newly forming bubble. This short time period of rapid gas flow is denoted as $t_2$ in FIG. 3 and it is much shorter than the bubble growth period $t_1$. The relatively high viscosity of the molten glass delays the separation and detaching of the bubble until the bubble has grown to the desired diameter of 0.5 to 4 cm, which may be several times the size shown in FIG. 4E, and then the bubble detaches and begins passing upward through the molten glass.

Two of the desired objectives achieved by the present invention are that the bubbles emanating from the opening 11 are larger than would be the case if the main supply line 5, or the feed line 6, were simply connected directly to the opening 11 without any restriction such as 12 or 112 and without any enlargement of space such as is provided by reservoir 13, and that the bubbles be of uniform size and uniformly spaced. The present inventor has found that these objectives are achieved by providing, in each of the feed lines 6 from which the uniform bubble flow is desired, that the pressure drop across the restriction associated with that feed line is significantly greater than the pressure fluctuation DP during a bubble formation, preferably greater than 5 times, more preferably greater than 10 times, most preferably greater than 100 times DP. Furthermore the volume of the space, including reservoir 13 if used, between the opening 11 and its associated restriction is sufficiently high that the gas flow into the bubble when the bubble begins to form comes mostly from the gas that has already accumulated in the space between the restriction and the associated opening 11 with contribution of a minor amount of gas that passes through the restriction into that space during the time period $t_2$ that the bubble is actually growing from the approximate hemispherical shape at FIG. 4D to a fully detached bubble.

More specifically, the amount of accumulated gas, that is, gas that has accumulated in the space between a restriction and its associated opening 11 beginning from the detachment of the previous bubble to detach from opening 11, is proportional to the volume, V, of that space and to the difference between the pressure, DP, in that space just after the previous bubble detached and the pressure in that space when the next bubble is about to become a hemi-spherical shape at opening 11 (at which point in time the pressure in that space is at its maximum, i.e., $P_2$). When the bubble has begun to grow beyond the hemi-spherical shape, an incremental amount of gas passes through the restriction into the space between the restriction and the opening 11 and contributes to the gas in that space that is entering the newly forming bubble. For achieving the objectives of the present invention, the ratio of the amount of accumulated gas in that space when growth of the bubble beyond the hemi-spherical shape begins, to the amount of incremental gas that enters the space from the point at which the gas-liquid interface grows beyond hemispherical to the point at which the bubble detaches from opening 11, should be at least 5 to 1 and preferably at least 10 to 1, more preferably at least 20 to 1, most preferably at least 100 to 1. The ratio of DP to the absolute pressure $P_1$ should be 1:10 or lower, preferably 1:100 or lower, and more preferably 1:1000 or lower. This relationship can be achieved by providing a sufficiently large volume in the space between the restriction and associated opening 11.

It should be noted that in some embodiments the volumes of each space between a restriction and the opening downstream from that restriction are all the same, whereas in other embodiments the volumes are not all equal to each other, such as where it is desired to differentiate the bubble formation characteristics in different regions of the liquid (such as having the bubble formation in the central region of a liquid bath different from the bubble formation at the edges of the bath).

The size of the bubble that is thus formed is largely determined by the amount of pressure $P_1$ that must be exerted by the accumulating gas in the space between the restriction and its associated opening 11 required to start a new bubble to form and by the volume of the space between the restriction and the opening 11. The amount of pressure required to start a new bubble is in turn determined by the hydrostatic pressure of the molten glass at opening 11 and the diameter of opening 11 and by the surface tension of the molten glass. Thus, for a given hydrostatic pressure, a diameter of opening 11 and the surface tension of the molten glass at opening 11, the bubble size can be increased or decreased by providing, respectively, a larger or lesser volume of the space between the restriction and opening 11. The rate at which bubbles form in this manner is controlled by the gas flow rate, with a higher flow rate producing a higher bubble formation rate and a lower flow rate producing a lower bubble formation rate. The diameter of the bubble increases only slightly as the rate of bubble formation is increased by increasing the gas flow rate. The gas flow rate is in turn controlled by the combination of the pressure of the gas upstream of the restriction and by the degree to which the restriction restricts the flow of gas therethrough. In those embodiments in which the size of the restriction is fixed, the rate of bubble formation is then controlled by controlling the pressure of the gas supplied to the restriction, with higher pressure producing a higher rate and a lower pressure producing a lower rate. However, the pressure should be high enough to produce a stream of bubbles that are spaced apart by a distance of at least half a bubble diameter thereby maintaining the bubbles non-coalescing.

In a glass tank the diameter of the gas bubble increases after it has detached from opening 11 due to heating of the gas in the bubble by the hot molten glass and also to the decreasing hydrostatic pressure as the bubble rises toward the molten glass surface. In situations in which the liquid in which the bubble forms, detaches and travels is at a temperature different from the temperature of the gas in line 6, the effect of the liquid temperature on the size of the bubble must be taken into account in establishing the appropriate volume, V, of the space between the restriction and its associated opening 11 and the pressure to obtain in that space as the bubble detaches and as the next bubble has formed and is about to detach, by relationships based on the ideal gas law. That is, the amount of gas in the bubble can be expressed as $$((P_1) \times (\text{bubble volume})) / ((\text{absolute temperature of the liquid}) \times (R, \text{the ideal gas constant})))$$

where $P_1$ is the absolute pressure at opening 11 when a bubble has just detached, and as $$((P_2 - P_1) \times (V) / (\text{absolute temperature of the gas in line } 6) \times (R) + (\text{the amount of gas that enters line 6 through the restriction while the bubble is growing beyond the hemi-spherical shape until the detachment})$$

where $P_2$ is the peak pressure at opening 11 when the bubble shape becomes hemi-spherical. If $P_1$, $P_2$, the gas and liquid temperatures, and the flow of gas through the restriction during bubble formation are set for a given system, then the volume of the bubble, and hence the diameter, can be established by appropriately adjusting the volume, V, of the space between the restriction and its associated opening 11.

EXAMPLE

The operation of the present invention in molten glass was simulated in a jar filled with honey at room temperature, which had been determined to have approximately the same viscosity as molten glass at 1450C. Four openings in the bottom of the jar were each fitted with a nozzle that ended in a single hole 1.5 mm in diameter. The other end of each nozzle was connected via a 4.8 mm inside diameter copper tube to a tank of about 130 cc internal volume. Each of these tanks was in turn connected by copper tubing (approximately 2 mm inside diameter) to a section of 3 mm inside diameter rubber tubing which was connected to a common header. A restriction of porous sintered metal was positioned in each section of rubber tubing. The restrictions permitted flow of about 20 cc per minute when the upstream pressure was about 27 psig and the downstream pressure was atmospheric.

Gas was supplied at a pressure of about 25 to 27 psig to each restriction. A steady and uniform flow of bubbles from each opening was viewed, at the rate of about 30 bubbles per minute. The bubbles appeared to be about 1 cm in diameter. When the volume of the gas tank in each of these feed lines was increased to about 400 cc, and the gas flow to each nozzle was increased by a combination of a less restrictive microporous cylinder as restriction 112 and increased feed pressure, the bubbles that formed were uniform, well spaced and about 2 cm in diameter.

What is claimed is:

1. A method for forming a plurality of streams of non-coalescing bubbles of helium in molten glass, wherein each bubble in a given stream is of substantially the same size, comprising:
   (A) providing a tank that contains molten glass;
   (B) providing two or more passageways through the tank each of which terminates in an upward facing opening that is in fluid communication with said molten glass in said tank below the upper surface of said molten glass;
   (C) providing a common gas supply line and a helium source which supplies gaseous helium at pressure to said common gas supply line;
   (D) providing gas feed lines each of which is in fluid communication with said gas supply line and with a different one of said passageways, and providing in each gas feed line a gas-permeable restriction so helium passing from said gas supply line to a passageway must pass through a gas-permeable restriction into the space between the restriction and the opening at the end of said passageway, wherein the pressure drop across said restriction is high enough and the volume of said space is large enough that non-coalescing bubbles of helium are produced from the end of said passageway into said molten glass; and
   (E) providing helium from said source into said gas supply line, wherein said helium passes into said gas feed lines through the restrictions associated therewith and said helium accumulates in said spaces and increases in pressure in said spaces while bubbles of helium begin to form at the openings at the ends of said passageways, and said helium intermittently detaches from the openings at the ends of said passageways as bubbles whose size is a function of the volume of said space, and
   (F) adjusting the pressure in said gas supply line so that said bubbles are spaced apart by at least half a bubble diameter.

2. A method according to claim 1 wherein the spaces between a restriction and the opening at the end of a passageway downstream from the restriction all have the same volume.

3. A method according to claim 1 wherein the spaces between a restriction and the opening at the end of a passageway downstream from the restriction do not all have the same volume.

4. A method according to claim 1 wherein the pressure in said gas supply line is 10 to 200 psig.

5. A method according to claim 1 wherein the openings at the ends of said passageways are 0.1 to 1.0 mm in diameter.

6. A method according to claim 1 wherein the openings at the ends of said passageways are 0.2 to 0.5 mm in diameter.

7. A method according to claim 1 wherein the diameter of the bubbles is 0.5 to 4 centimeters.

8. A method according to claim 1 wherein the diameter of the bubbles is 0.5 to 2 centimeters.

9. A method according to claim 1 wherein the pressure drop across the restriction in a gas feed line is at least 5 times the amount by which the pressure at the opening at the end of the passageway with which said feed line is in fluid communication increases from the beginning of bubble formation at said opening to the point at which a hemispherical gas-liquid interface has formed at said opening.

10. A method according to claim 1 wherein the pressure drop across the restriction in a gas feed line is at least 10 times the amount by which the pressure at the opening at the end of the passageway with which said feed line is in fluid communication increases from the beginning of bubble formation at said opening to the point at which a hemispherical gas-liquid interface has formed at said opening.

11. A method according to claim 1 wherein the pressure drop across the restriction in a gas feed line is at least 100 times the amount by which the pressure at the opening at the end of the passageway with which said feed line is in fluid communication increases from the beginning of bubble formation at said opening to the point at which a hemispherical gas-liquid interface has formed at said opening.

12. A method according to claim 1 wherein the ratio of the amount of gas accumulated in the space in a gas feed line between the restriction in said line and the end of the passageway with which said feed line is in fluid communication at the time when a bubble at the end of said line begins to grow beyond a hemispherical gas-liquid interface and the amount of gas that enters said space between that time and detachment of the bubble is at least 5 to 1.

13. A method according to claim 1 wherein the ratio of the amount of gas accumulated in the space in a gas feed line between the restriction in said line and the end of the passageway with which said feed line is in fluid communication at the time when a bubble at the end of said line begins to grow beyond a hemispherical gas-liquid interface and the amount of gas that enters said space between that time and detachment of the bubble is at least 10 to 1.

14. A method according to claim 1 wherein the ratio of the amount of gas accumulated in the space in a gas feed line between the restriction in said line and the end of the passageway with which said feed line is in fluid communication at the time when a bubble at the end of said line begins to grow beyond a hemispherical gas-liquid interface and the amount of gas that enters said space between that time and detachment of the bubble is at least 20 to 1.

15. A method according to claim 1 wherein the ratio of the amount of gas accumulated in the space in a gas feed line between the restriction in said line and the end of the passageway with which said feed line is in fluid communication at the time when a bubble at the end of said line begins to grow beyond a hemispherical gas-liquid interface and the amount of gas that enters said space between that time and detachment of the bubble is at least 100 to 1.

16. A method according to claim 1 wherein the ratio of the amount by which the pressure at the opening at the end of a passageway increases from the beginning of bubble formation at said opening to the point at which a hemispherical gas-liquid interface has formed at said opening to the absolute pressure at the opening when bubble formation first begins is 1:10 or lower.

17. A method according to claim 1 wherein the ratio of the amount by which the pressure at the opening at the end of a passageway increases from the beginning of bubble formation at said opening to the point at which a hemispherical gas-liquid interface has formed at said opening to the absolute pressure at the opening when bubble formation first begins is 1:100 or lower.

18. A method according to claim 1 wherein the ratio of the amount by which the pressure at the opening at the end of a passageway increases from the beginning of bubble formation at said opening to the point at which a hemispherical gas-liquid interface has formed at said opening to the absolute pressure at the opening when bubble formation first begins is 1:1000 or lower.

19. Apparatus useful for forming a plurality of non-coalescing bubbles of helium in molten glass, wherein each bubble in a given stream is of substantially the same size, comprising:
   (A) a tank that can contain molten glass;
   (B) two or more passageways through the tank each of which terminates in an upward facing opening that is in fluid communication with the interior of said tank;
   (C) a common gas supply line and a helium source which supplies gaseous helium at pressure to said common gas supply line; and
   (D) gas feed lines each of which is in fluid communication with a different one of said passageways and with said gas supply line, wherein each gas feed line contains a gas-permeable restriction so that gas passing from said gas supply line to any passageway must pass through a gas-permeable restriction into the space between the restriction and the opening at the end of said passageway, wherein the pressure drop across said restriction is high enough and the volume of said space is large enough that non-coalescing bubbles of helium are produced from the end of said passageway into said molten glass;
   wherein when helium is provided from said helium source into said gas supply line, said helium passes into said gas feed lines through the restrictions associated therewith and said helium accumulates in said spaces and increases in pressure in said spaces while bubbles of helium begin to form at the openings at the ends of said passageways, and said helium intermittently detaches from the openings at the ends of said passageways as bubbles whose size is a function of the volume of said space.

20. Apparatus according to claim 19 wherein the spaces between a restriction and the opening at the end of a passageway downstream from the restriction all have the same volume.

21. Apparatus according to claim 19 wherein the spaces between a restriction and the opening at the end of a passageway downstream from the restriction do not all have the same volume.

22. Apparatus according to claim 19 wherein the openings at the ends of said passageways is 0.1 to 1.0 mm in diameter.

23. Apparatus according to claim 19 wherein the openings at the ends of said passageways is 0.2 to 0.5 mm in diameter.

* * * * *